United States Patent [19]

Swedo

[11] Patent Number: 4,764,566
[45] Date of Patent: Aug. 16, 1988

[54] PENDANT BIPHENYLENE AS A CROSS-LINKING SITE IN AROMATIC THERMOPLASTIC POLYMERS

[75] Inventor: Raymond J. Swedo, Mt. Prospect, Ill.

[73] Assignee: Allied-Signal Inc., Morristown, N.J.

[21] Appl. No.: 46,813

[22] Filed: May 7, 1987

[51] Int. Cl.$^4$ .............................................. C08L 71/04
[52] U.S. Cl. .................................. 525/390; 525/397; 525/462; 525/471
[58] Field of Search ................ 525/462, 390, 397, 471

[56] References Cited

U.S. PATENT DOCUMENTS

| | | | |
|---|---|---|---|
| 4,197,393 | 4/1980 | Swedo et al. | 528/173 |
| 4,269,953 | 5/1981 | Brand | 525/534 |
| 4,414,380 | 11/1983 | Swedo | 528/173 |
| 4,507,462 | 3/1985 | Stille | 528/125 |

OTHER PUBLICATIONS

Garapon & Stille, *Macromolecules*, 10, 627 (1977).
Recca & Stille, ibid., 10, 1344 (1977) & 11, 479 (1978).
Swedo and Marvel, *J. Polymer Sci., Polymer Chem. Ed.*, 16, 2711 (1978).
Ibid, 15, 683 (1977) and 17, 2815 (1979).

*Primary Examiner*—Theodore E. Pertilla
*Attorney, Agent, or Firm*—Thomas K. McBride; Eugene I. Snyder

[57] ABSTRACT

Thermally stable polymers may be cross-linked by appending biphenylene moieties to the polymer backbone, then heating the modified polymer at a temperature in excess of about 300° C. The cross-link density of the cured polymer can be controlled by varying the relative population of biphenylene moieties on the polymer backbone. Properties of the modified but uncured polymer are essentially the same as those in the original thermally stable polymer.

14 Claims, No Drawings

PENDANT BIPHENYLENE AS A CROSS-LINKING SITE IN AROMATIC THERMOPLASTIC POLYMERS

BACKGROUND OF THE INVENTION

Fiber- and fabric-reinforced resins have achieved broad usage because of their relatively high strength-to-weight ratio and have been incorporated in articles as diverse as automobiles and tennis racquets. Many polymers have been used as matrix resins, such as polycarbonates, epoxy resin, and polyesters generally.

It is highly desirable that such reinforced resins be able to be worked or molded in the field without loss of strength. One approach to this goal has been to use a low melting polymer wich can be cured or cross-linked to a thermostable resin upon being melted, thereby permitting working and shaping concurrent with attainment of maximum strength.

Where cross-linking involves a chemical reaction which liberates a volatile by-product, voids may be produced in the resulting polymer leading to reduction in strength and limitations on shaping. This disadvantage has been overcome using the biphenylene nucleus as a cross-linking entity. Difunctionalized biphenylene monomers have been incorporated into polyquinoxalines (Garapon and Stille, Macromolecules, 10, 627 (1977); Recca and Stille, ibid., 10, 1344 (1977) and 11,479 (1978)), polyamides (Swedo and Marvel, J. Polymer Sci., Polymer Chem. Ed., 16, 2711 (1978)) and polyaromatic ether-ketones and ether-ketone-sulfones (idem., ibid., 15, 683 (1977) and 17, 2815 (1979)). In U.S. Pat. No. 4,197,393 the patentees incorporated the biphenylene nucleus into the polymer chain itself and upon subsequent heating cross-linking occurred via the formed biphenylene diradical to afford a thermostable resin. U.S. Pat. No. 4,269,953 presents the variant wherein the biphenylene nucleus is incorporated as an additive which causes cross-linking of a thermoplastic polymer upon heating.

The solutions embodied in the cited art suffer from the disadvantage that the source of the biphenylene entity in each case is inordinately expensive. For example, the patentees of U.S. Pat. No. 4,197,393 require a biphenylene dicarboxylic acid halide, available only via a multi-step synthesis from biphenylene. The patentee of U.S. Pat. No. 4,269,953 requires additives of the structure

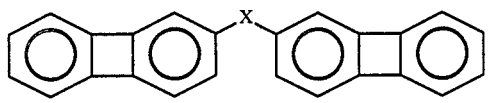

whose availability also is limited by the necessity of its multi-step synthesis from the parent biphenylene. Recognizing the limitations accompanying these disadvantages I have recently described an alternate solution in U.S. Pat. No. 4,414,380 where the biphenylene moiety is introduced into the backbone of the polymer chain via acylation by a dicarboxylic acid where one of the acid groups of the latter acylates biphenylene and the other acylates a diphenyl either or di(phenoxyphenyl)sulfone in a step-growth polymer.

However, even the latter approach suffers from the drawback that a new copolymer must be synthesized to incorporate the biphenylene units. In this application I have taken an approach radically different from that in the prior art by appending monofunctional biphenylene monomers onto a preformed thermally stable polymer containing aromatic nuclei, generally via a Friedel-Crafts reaction. The result is a polymer quite similar to the original one but with the biphenylene moieties, which can effect cross-linking upon being cured at a temperature in excess of about 300° C., pendant to the polymer chain or backbone.

The advantages of the current invention include the flexibility and convenience which result from starting with a commercially available polymer. Another advantage is that the current approach permits one to directly control cross-link density by the amount of biphenylene moieties incorporated, with the amount incorporated itself being readily controlled. Another advantage is that the instant approach has only a minimal effect on the properties of the polymer prior to cross-linking.

SUMMARY OF THE INVENTION

The purpose of my invention is to provide polymers which undergo cross-linking upon being heated, the cross-linking occurring via biphenylene diradicals arising through unsubstituted biphenylene being appended to the polymer chain, and a method of making such polymers. An embodiment comprises thermally stable polymers containing aromatic nuclei in the polymer chain and which are modified by having some aromatic nuclei covalently bonded to pendant biphenylene moieties. In a more specific embodiment the polymer is a poly(phenylene oxide) or a polyaryl ether-ketone-sulfone. In a still more specific embodiment the modified polymer contains from about 2 to about 30 mole percent biphenylene moiety. In yet another embodiment the modified polymer is prepared by Friedel-Crafts condensation of a monofunctional biphenylene with a thermally stable polymer containing aromatic nuclei in the polymer chain. Other embodiments will be clear from the ensuing description.

DESCRIPTION OF THE INVENTION

The invention here is a method of cross-linking thermally stable polymers containing aromatic nuclei by modifying the polymer so that the polymer will cure (cross-link) at an elevated temperature. In another aspect the invention is such modified polymers themselves. The invention herein is grounded on the concept of appending monofunctional biphenylene monomers onto preformed thermally stable polymers containing aromatic nuclei, often by a Friedel-Crafts reaction, but in any event by a reaction scheme represented by the sequence,

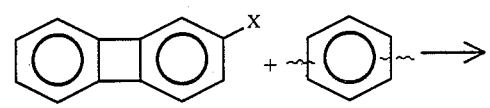

-continued

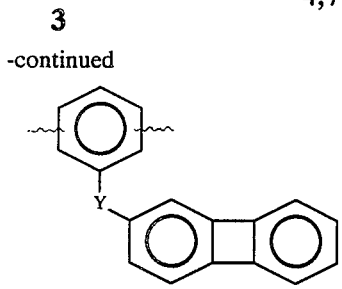

where

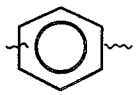

represents a thermally stable polymer containing aromatic nuclei in the polymer chain or backbone, and X is a group which can react with the aromatic nuclei under suitable conditions. This approach has the advantages of starting with a commercially available pre-made polymer having known properties, and being able to directly control cross-link density by the amount of biphenylene moiety added. Over all, the result is the conversion of a thermoplastic into a thermoset while retaining the most desirable properties of each system.

The thermally stable polymers which may be used in the practice of this invention are those having aromatic nuclei in the polymer chain or backbone. For the purpose of this invention a thermally stable polymer is a polymer having a glass transition temperature, Tg, of 150° C. or more. A thermoplastic polymer is one which becomes "plastic" upon heating, i.e., it softens and/or melts upon heating and can be processed. Some generic thermally stable polymers, with a specific example of each, include the poly(phenylene oxides) (PPO) such as poly(2,6-dimethyl-1,4-phenylene oxide); polycarbonates (PC), such as poly(bisphenol-A carbonate); polyaryl ether-ketones (PAEK), as for example polyphenyl ether-ketone; and polyaryl ether-ketone-sulfones (PAEKS), as exemplified by polyphenyl ether-ketone-sulfone. It is to be emphasized that the cited polymers are only illustrative and representative of the class of thermally stable polymers having aromatic nuclei in the polymer chain, and it is intended to include all such thermally stable polymers in this invention. As previously stated, many of the foregoing polymers are commercially available, which is a distinct advantage in the practice of this invention.

The thermally stable polymers having aromatic nuclei in their polymer chain are then reacted with a monofunctional biphenylene monomer to afford as the reaction product a modified polymer having a plurality of biphenylene moieties pendant to the polymer backbone. The reaction occurring is represented by the equation given above. As the equation implies, the biphenylene moiety is covalently bonded via an intervening atom or group Y to the aromatic nuclei, and the biphenylene moieties are pendant to the polymer backbone.

The reaction between the monofunctional biphenylene monomer and the aromatic nuclei is a condensation reaction, most often exemplified by a Friedel-Crafts reaction. Thus, the functional group X on the biphenylene is most often a carboxylic acid or an activated carboxylic acid, such as an anhydride or an acid halide, a halogen, or a sulfonyl halide. Hydroxylic (alcoholic) and olefinic functional groups are far less useful in condensation to aromatic nuclei in the polymer chain unless such nuclei bear activating substituents, e.g., halogens, but it will be recognized that the preparation of such substituted aromatic nuclei engenders additional synthetic procedures detracting from their usefulness. Thus, the monofunctional biphenylene monomer includes such materials as biphenylene carboxylic acids, biphenylene carboxylic acid anhydrides, biphenylene carboxylic acid halides, biphenylene sulfonyl halides, and biphenylene halides. Among the halides the chlorides are most useful because of their availability and reactivity, but other halides may be used in suitable cases. Where the condensation occurs via a Friedel-Crafts reaction typical Friedel-Crafts catalysts will be present, as for example aluminum chloride, boron trifluoride, ferric chloride, anhydrous hydrogen fluoride, etc.

The biphenylene moieties are incorporated to the extent of between about 2 and about 30 mole percent, with the preferred range being about 5 to about 10 mole percent. What is meant by, e.g., 5 mole percent of biphenylene moieties is that 5 percent of the repeating units in the polymer chain bear biphenylene groups. That is, for every 100 repeat units in the polymer chain there are 5 pendant biphenylene moieties. In practice, one calculates the repeat unit formula weight of the polymer, then determines the weight of polymer used in the experiment. This yields a number of moles of repeat unit. The moles of biphenylene units added is derived from this calculation. If one uses 10 g of a polymer having a repeat unit formula weight of 100, one has 0.1 mole of polymer. To incorporate 5 mole percent of some unit, one uses 0.005 moles of the unit in the reaction. Variation in the amount of biphenylene moieties incorporated results in variation in the resulting cross-linking density. That is, the latter can be controlled by the amount of biphenylene moieties appended to the polymer chain. The modified polymer resulting from appending biphenylene moieties to a thermally stable polymer containing aromatic nuclei in the backbone generally have properties quite similar to the original polymer, which is a decided advantage of this invention.

The polymers which have been modified by appending biphenylene moieties to the polymer chain may be cured or cross-linked by heating at a temperature in excess of about 300° C. for a time sufficient to effect cross-linking. Heating at such temperatures causes homolytic cleavage of the 4-membered ring of the biphenylene moiety to produce diradicals which then cross-link by coupling. Such cross-linking is especially attractive since it is not accompanied by the production of gaseous, void-producing byproducts. Curing is typically effected at a temperature between about 300° and about 400° C, more usually between about 325° and about 375° C. The time necessary to bring about cross-linking varies with temperature. At a curing temperature of about 350° C. one to two hours is usually quite sufficient.

The following examples serve only to illustrate my invention and are not intended to limit it in any way. Other variants will be recognized by those skilled in the art and are intended to be incorporated in my invention.

Biphenylene-2-carboxylic acid chloride (BAC) was synthesized according to the procedure of Boulton et al., J. Chem. Soc., 328 (1968). Polyaryl ether-ketone (PAEK) and polyaryl ether-ketone-sulfone (PAEKS) were synthesized as described by Swedo and Marvel, J. Poly. Sci., Poly Chem. Ed., 17, 2815 (1979). Poly(2,6-dimethyl-1,4-phenylene oxide) (PPO) and poly(bis-phenol-A carbonate) (PC) were purchased from Aldrich Chemicals and used as received.

Infrared spectra were determined using a Beckman Acculab 8 infrared spectrophotometer. NMR spectra were obtained using a Nicolet 300 MHz NMR spectrometer. DSC analyses were conducted with a Mettler TC-10 differential scanning calorimeter. Usual conditions were to scan from 20° to 400° C. at 10° C. per minute under nitrogen. Glass transition temperatures (TG), melting temperatures (Tm), and polymerization exotherms (EXO) were noted.

In some cases, polymer samples were cured in the DSC. This was accomplished by heating the sample to the desired temperature at the normal rate, maintaining the temperature for the desired time period, then cooling back to 20° C. and rescanning to 400° C. Polymerization kinetics were conducted in a similar manner.

EXAMPLE I

Derivatization of PPO with 25 Mole % BAC. Into a 50 mL resin kettle were placed 0.56 g (4.66 mmoles) of PPO and 12 mL of dry nitrobenzene. The mixture was stirred under nitrogen at room temperature until the polymer had dissolved, then the solution was cooled to 5° C. in an ice bath. Anhydrous aluminum chloride (0.62 g; 4.66 mmoles) was added in one portion. The resulting orange suspension was stirred under nitrogen while cooling in ice.

In a separate flask, 0.50 g (2.33 mmoles) of BAC was dissolved in 2 mL of dry nitrobenzene, and the yellow solution was cooled in an ice bath. Anhydrous aluminum chloride (0.34 g; 2.57 mmoles) was added in one portion; a deep red solution was formed. The red BAC-/AlCl$_3$ solution was rapidly added to the PPO/AlCl$_3$ mixture which was stirred under nitrogen and cooled in an ice bath. The resulting dark red solution was allowed to warm to room temperature over ca. 5 hours, and was then stirred at room temperature under nitrogen for a further 10 hours.

The red reaction mixture was poured into 350 mL of CH$_3$OH in a blender. The resulting yellow solid polymer was isolated by filtration, and was washed in the blender with 1×100 mL of 6N, HCl, 1×350 mL of H$_2$O, and 2×350 mL of CH$_3$OH, filtering between washings.

After vacuum drying at 60° C. for 14 hours, 0.60 g of product, here designated as PPO-BAC-25 were obtained. $^{13}$C-NMR analysis indicated that 25% of the PPO rings had been derivatized. IR analysis showed new bands at 1660, 1270, 1260, and 920 cm$^{-1}$ in addition to the original PPO bands.

EXAMPLE 2

Derivatization of PPO with 5 mole % BAC. Product designated as PPO-BAC-5 was synthesized as described above for PPO-BAC-25 from 3.46 g (28.8 mmoles) of PPO and 38.4 g (28.8 mmoles) of anhydrous aluminum chloride in 75 mL of dry nitrobenzene to which was added a solution of 0.62 g (2.88 mmoles) of BAC and 0.42 g (3.17 mmoles) of anhydrous aluminum chloride in 15 mL of dry nitrobenzene. Isolation, washing and drying were as described above. IR analysis showed the same features found for PPO-BAC-25.

EXAMPLE 3

Derivatization of PAEK with 5 Mole % BAC. Into a 100 mL flask were placed 2.00 g (6.66 mmoles) of PAEK and 20 mL of dry CHCl$_3$. The mixture was stirred under nitrogen while cooling in an ice bath for 20 min., then 2.70 g (20 mmoles) of anhydrous aluminum chloride were added in one portion. Stirring under nitrogen while cooling in ice was continued for a further 20 min., then 0.07 g (0.33 mmoles) of BAC were added. After about 30 min., a red rubbery solid began to separate on the inner walls of the flask.

The reaction mixture was allowed to warm to room temperature over about 1 hours, and was then stirred at room temperature under nitrogen overnight. The polymer was isolated, washed, and dried as described above. The yield of light brown PAEK-BAC-5 was 1.95 g.

EXAMPLE 4

Derivatization of PAEKS with 5 Mole % BAC. PAEKS-BAC-5 was synthesized as described above for PAEK-BAC-5 from 2.00 g (3.76 mmoles) of PAEKS and 3.20 g (24 mmoles) of anhydrous aluminum chloride in 25 mL of dry CHCl$_3$ to which were added 0.04 g (0.18 mmoles) of BAC. Isolation, washing, and drying were as described above, and the yield of PAEKS-BAC-5 was 1.90 g of grey polymer.

EXAMPLE 5

Derivatization of PC with 5 Mole % BAC. PC-BAC-5 was synthesized as described above for PAEK-BAC-5 from 2.00 g (7.87 mmoles) of PC, 0.08 g (0.36 mmoles) of PAC, and 3.20 g (24 mmoles) of anhydrous aluminum chloride in 25 mL of dry CHCl$_3$. Isolation, washing, and drying yielded 1.89 g of white solid PC-BAC-5.

EXAMPLE 6

Blend of PPO-BAC-25 with PAEKS. A mixture of 0.10 g of PAEKS and 0.10 g of PPO-BAC-25 were dissolved in 10 mL of CHCl$_3$, and the solution was cast on a Teflon sheet. The resulting clear yellow film of PPO-BAC-25/PAEKS was somewhat brittle.

EXAMPLE 7

Polymer Curing: DSC of Cured and Uncured Polymers. Samples of PAEK-BAC-5 and PAEKS-BAC-5 (ca. 1 g) were placed into aluminum foil cups and subsequently heated under nitrogen for 24 hours at 345° C. The aluminum foil was dissolved away in dilute HCl, and the polymers were isolated, washed well with H$_2$O, and dried.

Samples of PPO-BAC-25 and PPO-BAC-25/PAEKS were cured in the DSC as described above at 350° C. A cure time of 5 hours was used for PPO-BAC-25, but only 2 hours was used fo PPO-BAC-25/PAEKS.

TABLE 1

Thermal Data for BAC-Derivatized Polymers

| Polymer System | Cure Temp., °C. (Time, Hrs.) | Thermal Transitions, °C.[a] | | |
|---|---|---|---|---|
| | | $T_G$ | $T_M$ | EXO Onset[b] |
| PPO | — | 208 | 249 | — |
| PPO-BAC-25 | — | 205 | 252 | 270–300 |
| PPO-BAC-25 | 350 (5) | >400 | — | — |
| PPO-BAC-5 | — | 225 | 251 | 305 |
| PAEK | — | 148 | 272 | — |
| PAEK-BAC-5 | — | 153 | — | 305 |
| PAEK-BAC-5 | 345 (24) | 305 | — | — |
| PAEKS | — | 177 | — | — |

TABLE 1-continued

Thermal Data for BAC-Derivatized Polymers

| Polymer System | Cure Temp., °C. (Time, Hrs.) | Thermal Transitions, °C.[a] | | |
|---|---|---|---|---|
| | | $T_G$ | $T_M$ | EXO Onset[b] |
| PAEKS-BAC-5 | — | 172 | — | 300 |
| PAEKS-BAC-5 | 345 (24) | 182 | — | — |
| PC | — | 150 | — | — |
| PC-BAC-5 | — | 150 | — | 300 |
| PPO-BAC-25 PAEKS | — | 168 | — | — |
| PPO-BAC-25 PAEKS | 350 (2) | >400 | — | — |

[a] Determined on a Mettler TC-10 DSC, 20° to 400° C. scan at 10° C./min. under nitrogen.
[b] Onset temperature of biphenylene ring opening.

TABLE 2

Comparison of Thermal Data for Pendant and Backbone BAC-Derivatized PAEK and PAEKS

| Polymer | Cure Temp., °C. (Cure Time, Hrs.) | Tg, °C.[a] |
|---|---|---|
| PAEK | — | 148 |
| PAEK-BAC-5 (PENDANT) | — | 154 |
| PAEK-BAC-5 (PENDANT) | 345 (24) | 305 |
| PAEK-BAC-5 (BACKBONE)[b] | — | 124 |
| PAEK-BAC-5 (BACKBONE)[b] | 340 (20) | 138 |
| PAEKS | — | 177 |
| PAEKS-BAC-5 (PENDANT) | — | 172 |
| PAEKS-BAC-5 (PENDANT) | 345 (24) | 182 |
| PAEKS-BAC-5 (BACKBONE)[b] | — | 165 |
| PAEKS-BAC-5 (BACKBONE)[b] | 340 (20) | 195 |

[a] PENDANT data obtained using a Mettler TC-10 DSC; BACKBONE data obtained using a DuPont Model 990 Thermoanalyzer; all data obtained by scanning from 20° to 400° C. at 10° C./min. under nitrogen.
[b] U.S. Pat. No. 4,414,380.

What is claimed is:

1. A method of cross-linking a thermally stable polymer containing aromatic nuclei selected from the group consisting of poly(phenylene oxides), polyaryl ether-ketones, polyaryl ether-ketone-sulfones, and polycarbonates, said cross-linking unaccompanied by the production of gaseous void-producing byproducts, comprising reacting the polymer with a monofunctional biphenylene monomer to afford a reaction product having a plurality of biphenylene moieties pendant to the polymer backbone, and curing the product at a temperature in excess of about 300° C. for a time sufficient to cross-link said polymer.

2. The method of claim 1 where the polymer is a poly(phenylene oxide).

3. The method of claim 1 where the polymer is a polyaryl ether-ketone.

4. The method of claim 1 where the polymer is a polyaryl ether-ketone-sulfone.

5. The method of claim 1 where the polymer is a polycarbonate.

6. The method of claim 1 where the monofunctional biphenylene monomer is selected from the group consisting of biphenylene carboxylic acids, carboxylic acid anhydrides, and carboxylic acid halides, biphenylene sulfonyl halides, and biphenylene halides.

7. The method of claim 1 where curing is effected at a temperature between about 300° and about 400° C.

8. The method of claim 7 where the temperature is between 325° and 375° C.

9. A thermally stable polymer selected from the group consisting of poly(phenylene oxide), polyaryl ether-ketones, polyaryl ether-ketone-sulfones, and polycarbonates, having from about 2 to about 30 mole percent biphenylene moieties pendant to the polymer backbone where each biphenylene moiety is covalently bonded to an aromatic nucleus of the backbone.

10. The composition of claim 9 where the polymer is a poly(phenylene oxide).

11. The composition of claim 9 where the polymer is a polyaryl ether-ketone.

12. The composition of claim 9 where the polymer is a polyaryl ether-ketone-sulfone.

13. The composition of claim 9 where the polymer is a polycarbonate.

14. The composition of claim 9 where there are from about 5 to about 10 mole percent biphenylene moieties present.

* * * * *